United States Patent

Hsu et al.

[11] Patent Number: 6,078,701
[45] Date of Patent: Jun. 20, 2000

[54] METHOD AND APPARATUS FOR PERFORMING LOCAL TO GLOBAL MULTIFRAME ALIGNMENT TO CONSTRUCT MOSAIC IMAGES

[75] Inventors: Stephen Charles Hsu, East Windsor; Rakesh Kumar, Monmouth Junction; Harpreet Singh Sawhney, Cranbury; James R. Bergen; Doug Dixon, both of Hopewell; Vince Paragano, Lawrenceville; Gary Gendel, Neshanic Station, all of N.J.

[73] Assignee: Sarnoff Corporation, Princeton, N.J.

[21] Appl. No.: 09/087,242

[22] Filed: May 29, 1998

Related U.S. Application Data

[60] Provisional application No. 60/054,558, Aug. 1, 1997.

[51] Int. Cl.[7] ....................................................... G06K 9/32
[52] U.S. Cl. ........................... 382/294; 382/154; 382/284
[58] Field of Search .................................... 382/294, 293, 382/292, 282–284, 254, 154, 180; 345/435, 113–116, 427, 433; 348/584–601

[56] References Cited

U.S. PATENT DOCUMENTS

| | | | |
|---|---|---|---|
| 4,590,607 | 5/1986 | Kauth | 382/294 |
| 4,797,942 | 1/1989 | Burt | 382/284 |
| 4,835,532 | 5/1989 | Fant | 345/136 |
| 5,140,416 | 8/1992 | Tinkler | 348/33 |
| 5,168,530 | 12/1992 | Peregrim et al. | 382/199 |
| 5,187,754 | 2/1993 | Currin et al. | 382/284 |
| 5,262,856 | 11/1993 | Lippman et al. | 348/415 |
| 5,394,520 | 2/1995 | Hall | 345/435 |
| 5,550,937 | 8/1996 | Bell et al. | 382/293 |
| 5,611,000 | 3/1997 | Szeliski et al. | 382/294 |
| 5,613,013 | 3/1997 | Schuette | 382/124 |
| 5,649,032 | 7/1997 | Burt et al. | 382/284 |
| 5,657,402 | 8/1997 | Bender et al. | 382/284 |
| 5,751,852 | 5/1998 | Marimont et al. | 382/180 |
| 5,809,179 | 9/1998 | Marimont et al. | 382/254 |

FOREIGN PATENT DOCUMENTS

WO 95/10915   4/1995   WIPO   ............................ H04N 5/765

OTHER PUBLICATIONS

P.Burt, P. Anandan, "Image Stabilization by Registration to a Reference Mosaic", 1994 Image Understanding Workshop, Nov. 13–16, Monterey, CA 1994.

(List continued on next page.)

*Primary Examiner*—Leo H. Boudreau
*Assistant Examiner*—Ishrat Sherali
*Attorney, Agent, or Firm*—William J. Burke

[57] ABSTRACT

A method and apparatus that determines the topology of a sequence of images and then globally aligns the images with respect to each image's neighboring images. The apparatus includes a topology determination module, a local coarse registration module, a local fine registration module, a global consistency module, and a color matching/blending module. To accurately render a mosaic image from a sequence of images the topology determination and global alignment processes are iterated to progressively produce accurately aligned images. The apparatus efficiently and accurately combines a plurality of source images into a seamless panoramic mosaic representation of a scene, of arbitrarily wide spatial and angular extent, regardless of the order of image acquisition.

20 Claims, 6 Drawing Sheets

OTHER PUBLICATIONS

P. Burt, M. Hansen, P. Anandan, "Video Mosaic Displays", SPIE Vo. 2736, pp. 119–127.

L. McMillan, G. Bishop, "Plenoptic Modeling: An Image–Based Rendering System", Computer Graphics Proceedings, Annual Conference Series, 1995.

P.C. McLean, "Structured Video Coding", Submitted to Media Arts and Sciences Section, Massachusetts Instiute of Technology, May 10, 1991.

R. Szeliski, "Image Mosaicing for Tele–Reality Applications", Proceedings of Second IEEE Workshop on Applications of Computer Vision, Dec. 5–7, 1994.

R. Szeliski, S.B. Kang, "Direct Methods for Visual Scene Reconstruction", Proceedings IEEE Workshop on Representation of Visual Scenes, Jun. 24, 1995.

P.J. Burt, E. Adelson,"A Multiresolution Spline with Application to Image Mosaics", ACM Transactions on Graphics, vol. 2, No. 4, Oct. 1983, pp. 217–236.

P. Burt, E. Adelson, "Merging Images Through Pattern Decomposition", SPIE vol. 575 Applications of Digital Image Processing VIII (1985) pp. 173–180.

Hartley, Richard I., "Self–Calibration from Multiple Views with a Rotating Camera", Lecture Notes in Computer Science, vol. 800, pp. 471–478, 1994.

Sun, Huifang and Kwok, Wilson, "Concealment of Damaged Block Transform Coded Images Using Projections onto Convex Sets", IEEE Transactions on Image Processing, vol. 4, No. 4, Apr. 1995.

International Search Report.

END OF CYCLE 1

START OF CYCLE 2

START OF CYCLE 3

END OF CYCLE 2

METHOD AND APPARATUS FOR PERFORMING LOCAL TO GLOBAL MULTIFRAME ALIGNMENT TO CONSTRUCT MOSAIC IMAGES

This application claims benefit of U.S. provisional application Ser. No. 60/054,558, filed Aug. 1, 1997, which is hereby incorporated herein by reference.

GOVERNMENT RIGHTS IN THIS INVENTION

This invention was made with U.S. government support under contract No. DAAB07-95-C-M025. The U.S. government has certain rights in this invention.

This invention relates to systems that process picture and video information and, more specifically, to systems that combine multiple still pictures and/or video frames to form a panoramic representation of an extended scene.

BACKGROUND OF THE DISCLOSURE

In many image processing systems it is desirable to form panoramic images from a plurality of individual images or from a sequence of video frames. To form a panoramic image, the images of the scene must be aligned with one another and merged (stitched) to form a comprehensive panoramic image of a scene with redundant information removed therefrom. A mosaic image is generally a data structure that melds information from a set of still pictures and/or frames of a video sequence (collectively, "images"), which individually observe the same physical scene at a plurality of different time instants, viewpoints, fields of view, resolutions, and the like. The various images are geometrically aligned and colorimetrically matched, then merged together to form a panoramic view of the scene as a single coherent image.

The phrase image processing, as used herein, is intended to encompass the processing of all forms of images including temporally unrelated images as well as images (frames) of a video signal, i.e., a sequence of temporally related images.

Accurate image alignment is the cornerstone of a process that creates mosaics of multiple images. Alignment (also known as registration) of images begins with determining a displacement field that represents the offset between the images and then warping one image to the other to remove or minimize the offset.

In order for the mosaic to be coherent, points in the mosaic must be in one-to-one correspondence with points in the scene. Accordingly, given a reference coordinate system on a surface to which source images will be warped and combined, it is necessary to determine the exact spatial mapping between points in the reference coordinate system and pixels of each image.

Methods for manually or automatically producing mosaics from source images are known in the art. One example of an automatic mosaic generation system is disclosed in U.S. Pat. No. 5,649,032 issued Jul. 15, 1997, which is hereby incorporated herein by reference. In this patent, temporally adjacent video frames are registered to each other, yielding a chain of image-to-image mappings which are then recursively composed to infer all the reference-to-image mappings. Alternatively, each new frame is registered to the mosaic which was recursively constructed from previous frames, yielding the desired reference-to-image mappings directly. The '032 patent describes techniques that use both frame-to-frame or frame-to-mosaic registrations to accurately align the images.

These known methods have several disadvantages. First, if any one of the frame-to-frame registrations cannot be estimated accurately, the chain is broken and subsequent frames cannot be reckoned with respect to the same reference coordinate system. Second, when the camera's field of view overlaps part of the scene which was originally observed a long time ago, these methods do not ensure that the new images will be registered with those old ones. For example, FIG. 1 depicts a time order sequence of images 101 to 108, where the images are formed by panning a camera from left to right (represented by arrow 109) for images 101 to 104 and panning a camera from right to left (represented by arrow 110) for images 105 to 108. The bottom regions of images 101 through 104 overlap the top regions of images 105 through 108. If images in the spatial configuration of FIG. 1 occur in time order starting with image 101 and continuing through image 108, and each image is registered to its predecessor image, then there is no assurance that images 101 and 108 will be in alignment when warped to the mosaic's reference coordinate system. As such, the first images (e.g., image 101) may not align properly with a latter produced image (e.g., image 108) along the overlapping portions of these images. Consequently, a panoramic mosaic produced using techniques of the prior art may be significantly distorted.

In prior art methods, not only can frames in the mosaic be misaligned, but also the overall structure of the scene may be incorrectly represented. For example, some scene parts may appear twice, or parts that should be (should not be) adjacent appear far away from (close together) one another. If the images form a large closed loop, the closure might not be represented in the mosaic. These errors occur when the complete topology of neighborhood relationships among images is not fully recognized.

A further limitation of existing mosaic generation techniques is that they estimate spatial mappings suitable only for combining images onto a cylindrical or planar reference surface, which is not a suitable representation for panoramas that subtend angles of more than about 140° in both directions.

Therefore, a need exists in the art for an image processing technique that forms panoramic mosaics by determining the topology of an image sequence and globally aligning the images in accordance with the topology.

SUMMARY OF THE INVENTION

The present invention overcomes the disadvantages of the prior art by providing a method and apparatus that determines the topology of a sequence of images and then globally aligns the images with respect to each image's neighboring images. The invention includes a topology determination module, a local coarse registration module, a local fine registration module, a global consistency module, and a color matching/blending module. To accurately render a mosaic image from a sequence of images the topology determination and image registration processes are iterated to progressively produce accurately aligned images. The invention efficiently and accurately combines a plurality of source images into a seamless panoramic mosaic representation of a scene, of arbitrarily wide spatial and angular extent, regardless of the order of image acquisition (as long as consecutive frames overlap one another). Moreover, the invention does not require calibration of the camera and does not severely restrict the motion of the camera in space.

More specifically, the topology determination module identifies the pairs of images that spatially overlap each other, referred to as "neighbors". Local coarse registration estimates a low complexity approximate spatial mapping between the neighbors. Fine local registration estimates a higher complexity mapping between neighbors or between an image and the current estimate of a mosaic. The global consistency module infers all the reference-to-image mappings by simultaneously optimizing all the mappings such that they are maximally consistent with all the local registration information and with a chosen reference surface shape, e.g. planar or spherical. For efficiency, this inference is based solely on the results of local registration, without accessing source image pixels. While any of a number of local alignment measures could be used, for greatest efficiency, a local error function can be precomputed so that global consistency does not need to access the source image pixels. Once the images are aligned, the color matching/blending module combines the images to form a mosaic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
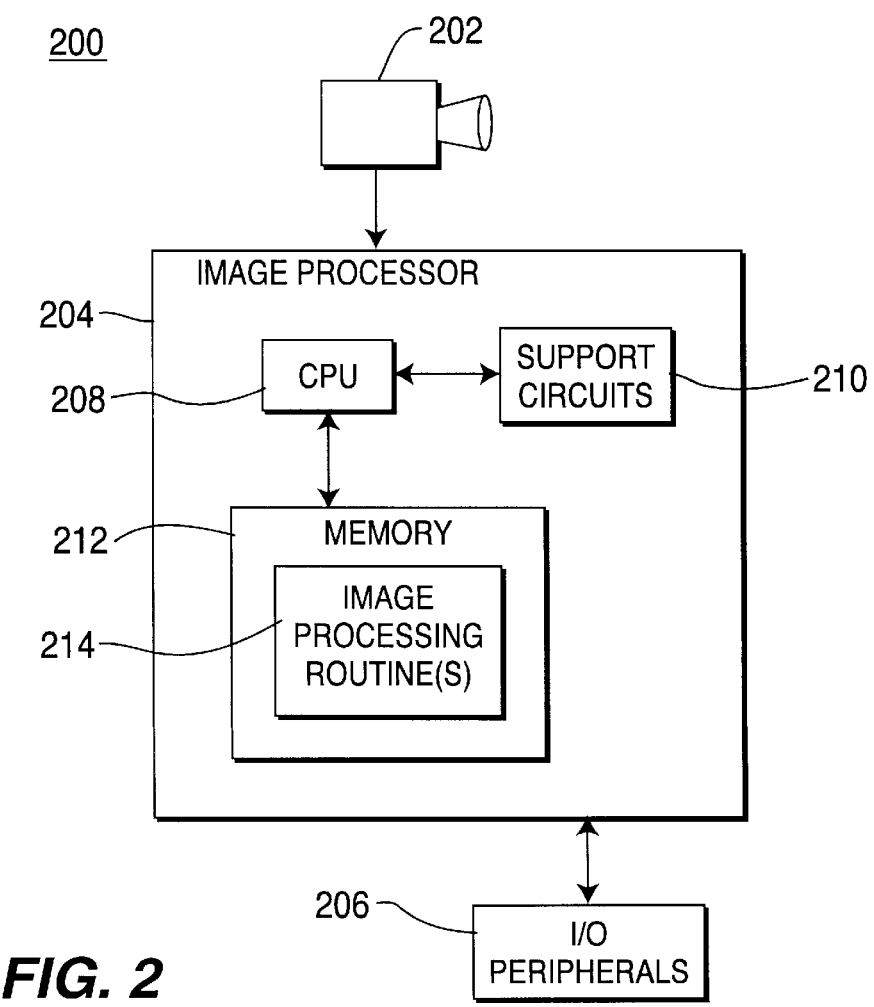
FIG. 2 depicts a block diagram of a general purpose computer system used to implement the present invention.

FIG. 2 depicts a block diagram of an image processing system 200 comprising at least one image sensor (e.g., a camera 202, although other sensors may be used) and an image processor 204. The camera 202 is assumed to produce a plurality of digital still images or digital video frames, i.e., two-dimensional arrays of pixel values. However, the camera may be an analog sensor that produces an analog signal and additional circuitry may be used to convert the analog signals into digital images for processing. To process the digital images, the image processor 204 comprises a central processing unit (CPU) 208, a memory device 210, conventional CPU support circuits 212. The image processor 206 is coupled to conventional input/output (I/O) peripherals 208 such as a keyboard, a mouse, and a display. The CPU 208 is a general purpose computer that, when executing specific routines that are recalled form memory 210, becomes a specific purpose computer, e.g., an image processor. The CPU can be any processor such as a PENTIUM II processor manufactured by Intel Corporation or a POWER PC processor manufactured by Motorola Inc. The memory 210 can be random access memory (RAM), read only memory (ROM), a hard disk drive, a floppy disk drive or any combination thereof. The support circuits 212 include various conventional circuits such as frame grabber circuits, analog-to-digital (A/D) circuits, clock circuits, cache, power supplies, I/O drivers, and the like. The I/O peripherals 208 generally include a keyboard, a mouse, and a display, but may also include a video tape recorder, a video disk player, and the like. The images that are processed by the image processor 204 may not be sourced directly from a sensor (camera 202), but may also be sourced from pre-recorded images such as would be provided by a video tape recorder, computer disk or other image storage device as well as from a remote sensor or recorder through a communications system.

The present invention is embodied in an executable image processing routine 214 that, when executed by the CPU 208, provides a two-dimensional mosaicing method and apparatus that globally registers images to an arbitrary two-dimensional surface (a manifold) such that each image in a sequence of images is registered to all of its spatially neighboring images. Although the embodiment of the invention is described as a software implementation, those skilled in the art will realize that the invention can be implemented in hardware or as a combination of hardware and software. Thus each of the functional aspects of the routine can be wholly or partially implemented in one or more hardware devices.

Figure 3:
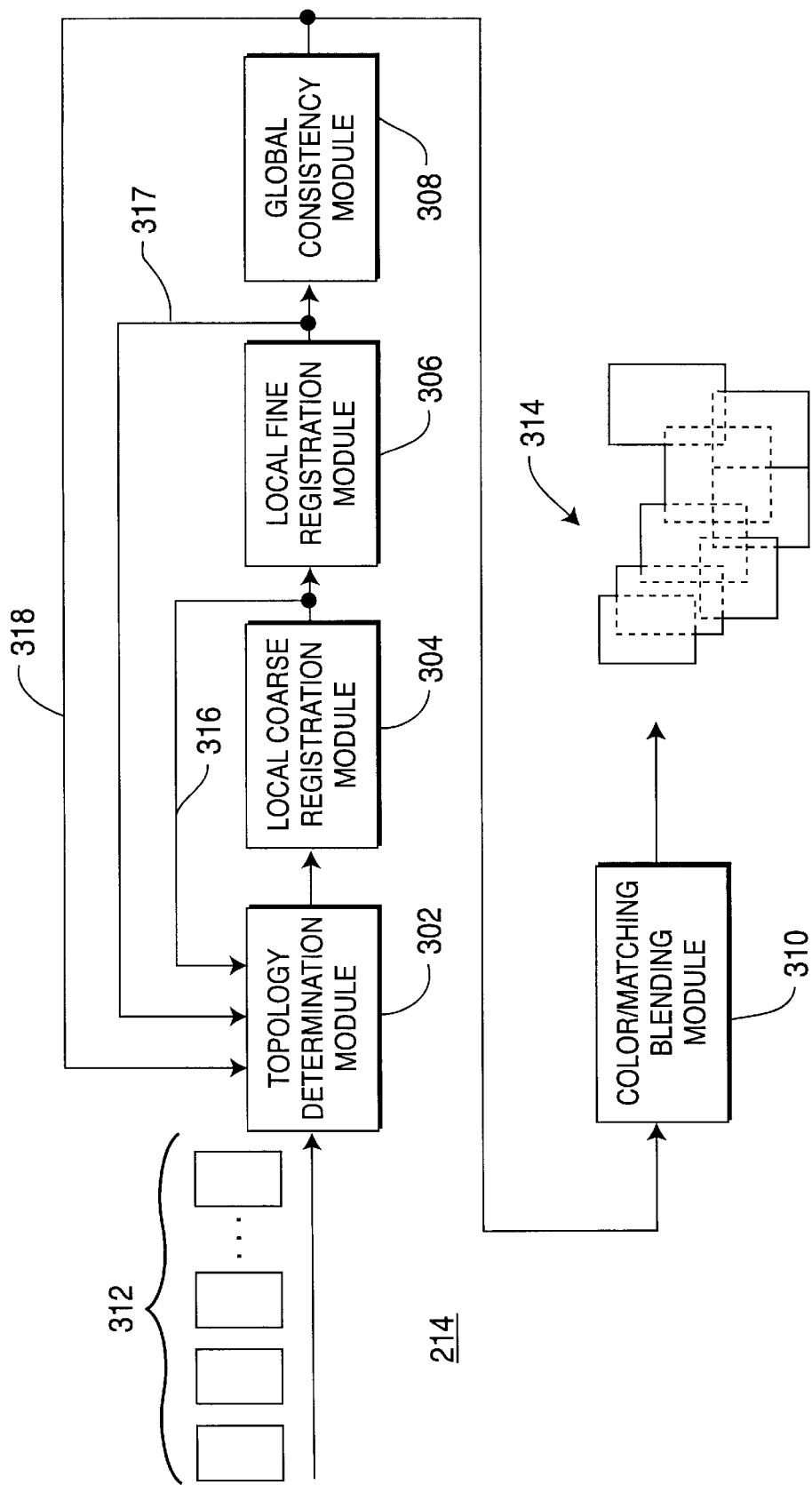
FIG. 3 depicts a functional block diagram of the present invention.

FIG. 3 depicts a functional block diagram of the routine 214 that is executed by the processor to implement a two-dimensional mosaicing system 200 of the present invention. The system 200 contains a topology determination module 302 local coarse registration module 304, local fine registration module 306, global consistency module 308, and color matching/blending module 310. This system efficiently and accurately combines a plurality of source images 312 into a seamless panoramic mosaic representation (mosaic 314) of a scene, of arbitrarily wide spatial and angular extent, regardless of the order of image acquisition. Moreover, the method does not require calibration of the camera and does not severely restrict the motion of the camera in space.

Generally, the invention registers the imagery to a planar surface such that mosaics of planar images such as paintings, whiteboards, as well as mosaics of three-dimensional scenes that are imaged using a relatively small viewing angle. However, when the scene is captured through a panoramic sequence of images that closes on itself or covers a complete sphere or a significant part of a sphere around a fixed viewpoint, then the planar surface is not adequate for seamless representation of the scene. As such, the invention uses a conical, cylindrical or spherical surface upon which to register the images. This surface may be selected manually from a menu of surface types; however, in the preferred embodiment, the surface is selected by inspecting the registration parameters and topology of the images.

A two-dimensional manifold, e.g., a plane or a sphere, may be explicitly used for representing planar images on the manifold. Alternatively, the specific transformations used to map points between images (frames) can be implicitly used to represent the input frames on a manifold. In either case, the topology determination module 302 determines which frames in a sequence overlap and hence are neighbors on the appropriate manifold. The topology determination process is an iterative process that is performed after frames have been coarsely positioned with respect to one another and specific transformations of all the overlapping images can be computed.

The system 200 processes images in an iterative technique such that the accuracy of the image registration and topology is improved with each iteration. The topology determination module 302 hypothesizes which pairs of images spatially overlap each other, henceforth called "neighbors", based the layout implied by the current estimated mosaic-to-frame registration parameters. (On an initial pass, no such estimate exists, so topology module 302 merely presumes that successively numbered frames are neighbors.) Local coarse- and fine-registration modules 304 and 306 estimate a spatial mapping between neighbors to validate or refute the hypotheses. Good quality registrations are returned via path 316 or 317 to topology module 302 to update the topology, and are also sent to module 308. The global consistency module 308 infers all the reference-to-image mappings by simultaneously optimizing the mappings, such that they are maximally consistent with all the local registration information and with the chosen reference surface shape, e.g., planar or spherical. Global consistency may be imposed by solving for purely parametric alignment models corresponding to the two-dimensional manifold over which the mosaic is represented. In addition, misalignments due to departures from the global models are handled by quasi-parametric or piecewise parametric alignment between regions of overlap.

The improved estimate of image positions with respect to the mosaic produced by global consistency may help to correct errors and fill in unknown neighbor relationships in the scene topology. Therefore, feedback path 318 sends registration parameters back to topology module 302, which can then identify any neighbors that were not previously apparent. As such, the routine of the present invention iterates through the topology determination module 302, the local coarse registration module 304, the fine local registration module 306 and the global consistency module 308 until a predefined level of topological and alignment accuracy is produced.

While the previously described stages accomplish geometric alignment of the source images, the color matching/blending module 310 adjusts for discrepancies in color and brightness between the aligned images. This is a critical process that is performed to avoid noticeable seams in the mosaic. A detailed description of a blending technique is disclosed in commonly assigned U.S. patent application Ser. No. 08/966,776, filed Nov. 10, 1997 and herein incorporated by reference. The output of the color matching/blending module 310 is the desired mosaic representation 314 of the scene.

Additionally, the system of the present invention may benefit from a lens distortion correction process. Such a process is described in detail in commonly assigned U.S. patent application Ser. No. 08/966,776, filed Nov. 10, 1997 and herein incorporated by reference. A lens correction process can be incorporated into the global consistency module 308 of either of the registration modules 304, 306 and used to correct any distortion in the mosaic that is caused by the lens of the camera.

Figure 4:
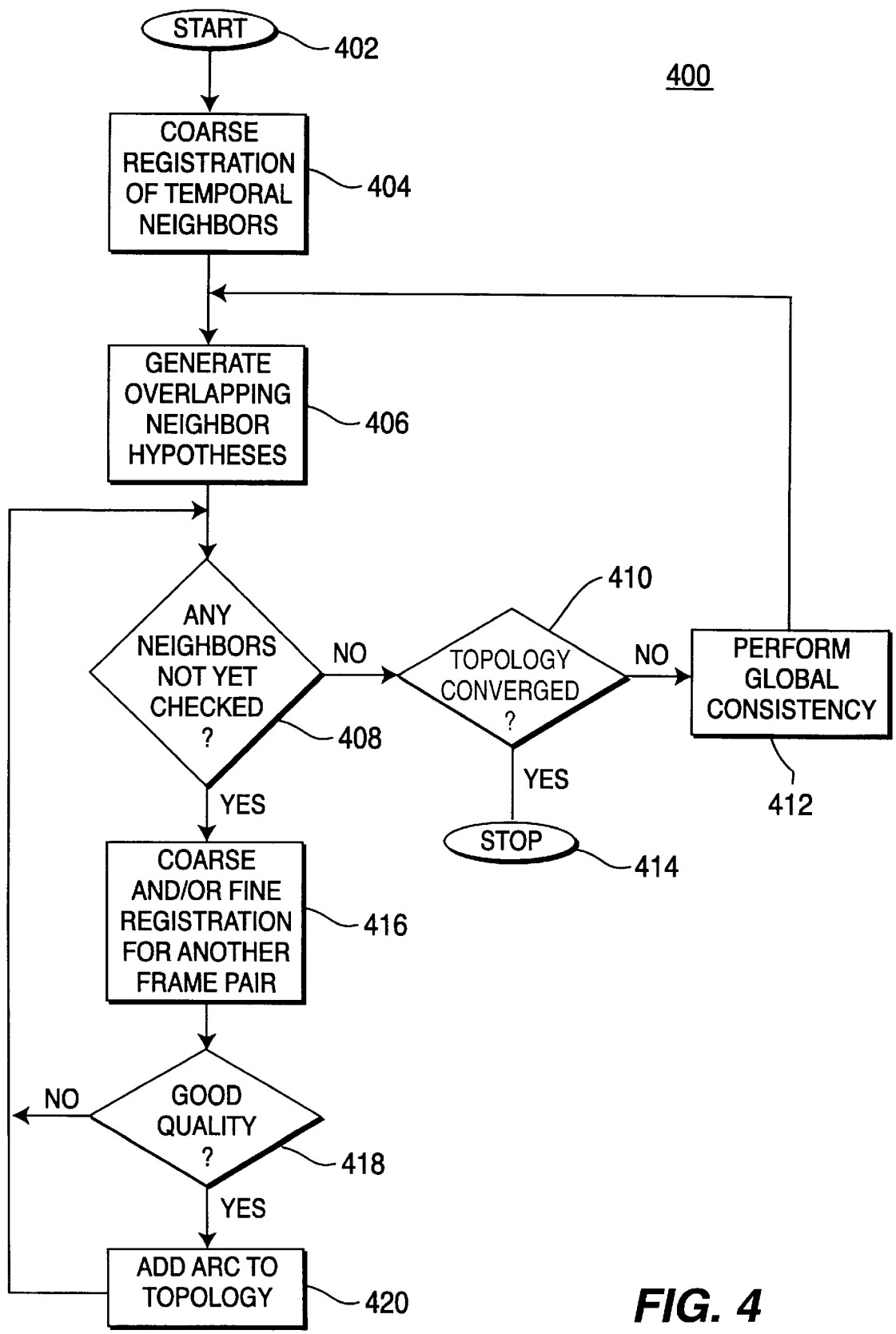
FIG. 4 is a flow diagram representing the process steps performed by the present invention.

FIG. 4 depicts flow diagram representing the operation (routine 400) of the modules 302, 304, and 306 and 308 of the present invention. The process begins at step 402 and proceeds to step 404, where a coarse registration is performed to produce alignment parameters for pairs of neighbor images that are temporal neighbors. At step 406, the topology determination module 302 generates an overlapping neighbor hypotheses for each of the neighbors that it believes are now overlapping in view of the coarse registration. In step 408, routine 400 queries whether any neighbors have not yet been checked to see if they are neighbors. If the query is affirmatively answered, the routine 400 proceeds to step 416 where a coarse and/or fine registration is performed between an image pair that is hypothesized as being neighbors. Depending on the accuracy of the current alignment, either coarse registration or fine registration is performed. At step 418 the routine 400 queries whether the quality of registration is "good". If the quality is sufficient, the routine proceeds to step 420 where the alignment parameters of the images are stored and the topology graph is updated with an additional arc connecting the two newly registered neighbor images. The routine then returns to step 408 to process another pair of images. If the query at step 418 is negatively answered, the routine returns to step 408 to further register the pair of images using steps 408 and 416. If the query at step 408 is negatively answered, the routine proceeds to step 410. In step 410, the routine queries whether the topology has converged sufficiently to insure that all the neighbor images have now been processed and registration parameters have been derived for each pair of overlapping neighbor images. If the query at step 410 is affirmatively answered, the routine stops at step 414. However, if the query at step 410 is negatively answered, the routine proceeds to step 412 and performs the global consistency process of module 308. Once the global consistency is performed the routine returns to step 406 where another hypotheses of overlapping neighbor images is generated by the topology determination module 302 and the routine process to process any newly identified neighbor images.

More specifically, the goal of geometric alignment performed by modules 302, 304, and 306 is to calculate an optimal set of reference-to-image mappings u=$P_i$(x) where x denotes a point on the reference surface and u is a point on the ith source image. In general, the shape of the reference surface and the source image surfaces can be any two-dimensional manifold represented in three-dimensions, such as planes and spheres. In the case of two-dimensional mosaicing, each $P_i$ will be restricted to a parametric family of mappings, such as perspective projection or affine or three-dimensional rotations.

Denote the mosaic image to be constructed by a space-varying brightness/color function M(x), and the source images by $I_i$(u). It is desirable to determine the $P_i$ so that for each x, the point $P_i$(x) in every image i corresponds to the same point in the physical scene. This condition assures that the mosaic image M(x) constructed by combining pixels $\{I_i(P_i(x)), \forall i\}$ will yield a spatially coherent mosaic, where each point x is in one-to-one correspondence with a point in the scene.

To achieve alignment of the images to all neighbors, the global consistency module 308 optimizes a function that measures the misalignment between image frames as well as the redundancy in information. The function, a Minimum Description Length (MDL) cost function, is represented as:

$$\min_{\{P_i\}} \sum_x \text{var}_i\{I_i(P_i(x))\} + \sigma^2(\text{Area of the Mosaic}) \quad (1)$$

where:

σ is a scale factor; and $var_i\{.\}$ denotes the variance of the pixels from different frames that map to each x.

The MDL cost function measures the compactness of representing a collection of frames in the form of a mosaic plus residuals of frames with respect to the mosaic. Note that the variances could be measured not just on the intensities directly, but alternatively on filtered representations of image intensities, or on the point locations P(x)'s directly.

In order to optimize the MDL cost function of Equation 1, the invention maximizes the overlap between aligned frames in the mosaic coordinate system by finding the globally optimal alignment parameters. The inventive technique is based upon the observation that if the two-dimensional topology of the input frames is know on an appropriate two-dimensional manifold, and the local alignment parameters (or other correspondences) are available between neighboring frames, then a global bundle block adjustment can be used to solve for accurate $P_{ij}$'s. On the other hand, if approximate knowledge of $P_i$'s is available, then neighborhood relations can be inferred that can further establish new relationships between frames. The invention switches between the two steps of topology determination and parameter estimation in an iterative manner to reach a globally optimal solution. The topology determination module 302 hypothesizes local neighborhood relations, and the global consistency module 308 uses the local constraints to determine the alignment parameters. In between these two modules, the invention, using the local fine registration module 306, establishes correspondence relations between the neighboring frames and verify these with a quality measure. The overall alignment process is accomplished using both a local coarse and fine alignment.

When the source image collection does not exhibit occlusion or significant parallax effects, the three-dimensional scene can be treated as a smooth two-dimensional manifold and thus the notion of one-to-one correspondence between the images is well defined. This one-to-one correspondence assumption is maintained as long as the camera only rotates about a fixed center, or else if the observed scene really is smooth. A more general case of not having a one-to-one correspondence is discussed next.

The primary source of information from which the $P_i$'s must be deduced is the raw image pixel values, $I_i(u)$. More specifically, in this invention the images are used to estimate the relative mappings $u'=Q_{ij}(u)$ between pairs of images. This is performed by the first three stages of the invention, topology determination, coarse local registration, and fine local registration. Finally, the local relative mappings are used in the global consistency stage to simultaneously estimate all the $P_i$'s to achieve an optimal global alignment.

As a precursor to local coarse registration, it is necessary to know which pairs of images i,j are "neighbors", i.e. have fields of view with sufficient spatial overlap, for only such pairs allow estimation of $Q_{ij}$. How much overlap is enough depends on the distribution of image features and the local registration technique used to align the images. The set of all image pairs constitutes a graph of neighbor images, G.

Given a random collection of images with no a priori spatial or temporal relationships, having an image processing system automatically identify neighbors may be an arbitrarily difficult problem. Using the topology determination module 302, the present invention performs fully automatic topology determination as long as successively numbered images have spatial overlap. This condition is typically satisfied when the image collection consists of time-ordered frames of a natural video sequence, or when a user has interactively organized a random image collection into a spatially ordered sequence. Under this assumption, it is reasonable for the initial topology to default to a linear chain of successively numbered images.

At the start of the first iteration used to align the images, there is typically no information on the image alignment parameters ($P_i$'s) whatsoever; hence, under the reasonable assumption that consecutive frames of a video sequence are overlapping, the initial topology defaults to a linear chain of temporal neighbors. Local alignment of such neighbors and global consistency—a trivial concatenation of motion models—yield the first estimate of $P_i$. The neighborhood relations are represented as a graph whose nodes represent frames and whose arcs represent neighbor relations.

Figure 1:
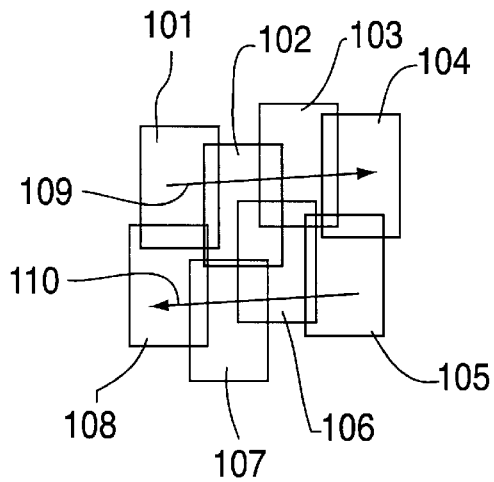
FIG. 1 illustrates a sequence of overlapping images captured by a camera as the camera moves in a serpentine (pan and scan) pattern.

Later, after one or more of the registration modules 302 or 306 has created preliminary estimates of $P_i$'s, the topology can be recalculated: some neighbors may be added, while others may be dropped. Changes in the topology due to such feedback may lead to revising the estimates of local and global registration. For example, in the case of FIG. 1, initially it is assumed that neighbors are the temporally adjacent images 101–102, 102–103, ..., 107–108. Only by performing registration will the spatial organization become apparent, and images 101–108, 102–107, and 103–106 be discovered to be neighbors. These new pairs of images will then be locally registered in the local fine registration module 306.

More specifically, in subsequent iterations, topology determination may become nontrivial. Non-consecutive frames may be discovered to be neighbors, such as frames in adjacent swipes of an S pattern or pairs which close a loop or spiral scan. These patterns can be formed on any shape of reference surface if the direction of camera motion changes. In case of a closed shape like a sphere, moreover, loops can be formed even with constant camera motion, as typified by scanning a 360° panorama. Because topology is inferred from only approximate knowledge of $P_i$ and because the choice of surface shape may be changed during the course of global consistency (e.g., from planar to spherical), it is possible that not all proper neighbors will be found during the second iteration; multiple iterations may be required to converge to agreement between topology and parameter estimation.

Figure 5A:
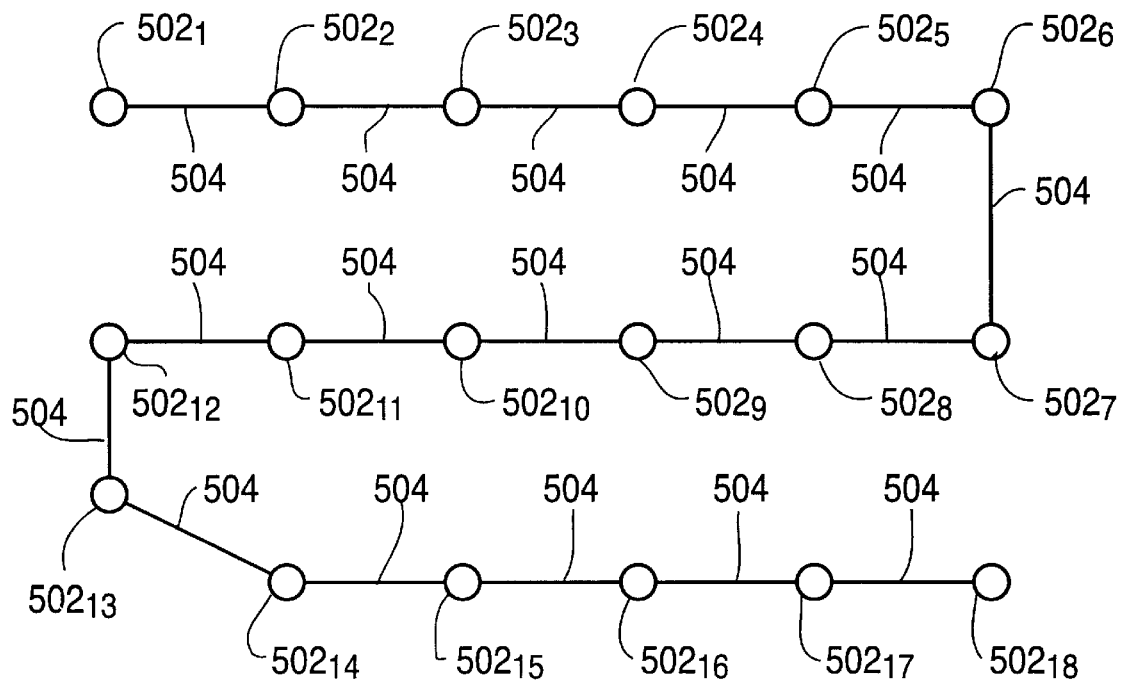
FIGS. 5A and 5B depict a graphical representation of image interrelationships with reference to a planar surface.
Figure 5B:
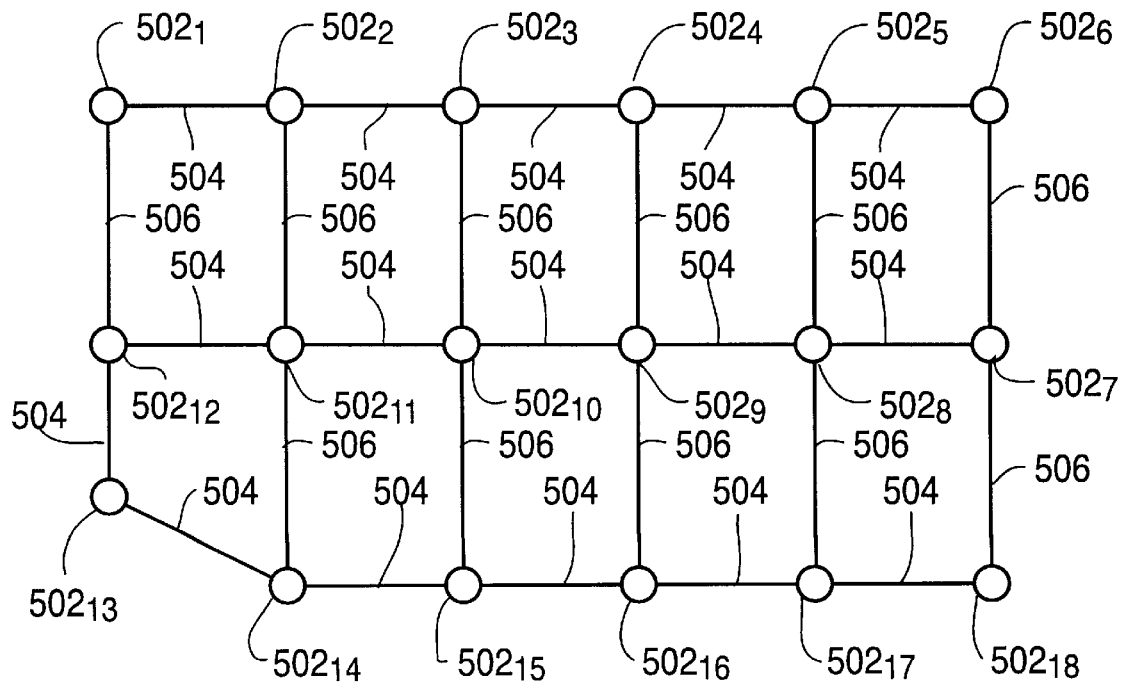

Consequently, the image processor updates the topology at the start of each iteration by generating hypotheses for new neighbors. The hypothesis is verified or refuted by local registration, and adding only verified neighbors as arcs (connective traces) in a neighbor relation graph, G. An exemplary neighborhood relation graph 500 is depicted in FIGS. 5A and 5B for a sequence of images that are captured by a serpentine scan of a scene. In FIG. 5A, the arcs 504 interconnect the temporally overlapping images $502_n$, where n is the image number in the sequence and the system has made one processing pass such that the initial, linear topology has been identified. FIG. 5B depicts a subsequent topology (e.g., second iteration) that adds arcs 506 representing an updated hypothesis of neighborhood relations. New candidate neighbors might be selected using various criteria, including influence on subsequent global estimation and proximity of the images.

1. The existing topology dictates where adding new arcs would have the most effect on the accuracy of the global parameter estimate. The first arc that closes a loop or ties together two swipes is significant, but not one which parallels many other nearby arcs. It is not essential to include every possible overlapping pair in the topology for accurate global alignment, nor is it computationally efficient. Therefore, it is desirable to limit the density of arcs within any local region.

2. The current topology and set of global parameter estimates $P_1$ determine the relative spatial locations and uncertainty for any pair of frames under consideration. It is desirable to choose pairs which are most likely to overlap and to have least positional uncertainty so that local alignment need not search a large range.

The two desiderata are generally in direct conflict, since arcs of high payoff (influence) are very often image pairs with high risk (positional uncertainty). The present invention prioritizes candidate arcs by greatest overlap rather than greatest influence, and additionally skips arcs too close to existing ones. It is expected that as iterations progress, global parameter estimates will increase in accuracy, drawing the high leverage pairs closer until they have reasonable overlap and uncertainty to become registered and added to graph G.

Specifically, within the topology determination module 304, candidate neighbors are added by considering their arc length $d_{ij}$ in relation to path length $D_{ij}$. Arc length is defined by the distance between warped image centers $x_i, x_j$ on the mosaic surface, normalized by the warped frame "radii" $r_i, r_j$:

$$d_{ij} = \frac{\max(0, |x_i - x_j| - |r_i - r_j|)}{\min(r_i, r_j)}$$

Path length $D_{ij}$ is defined as the sum of arc lengths along the minimum sum path between nodes i,j in the existing graph. To add an arc, $d_{ij}$ must not exceed a maximum limit and must be significantly shorter than $D_{ij}$, and the image reliability measure $p_{ij}$ (see below) must be high. This heuristic tends to select arcs that both have good overlap and will add non-redundant constraints to the global bundle block adjustment.

For each neighboring pair of images, it is desired to estimate the relative mapping $Q_{ij}$ such that, for each point u in image i, the point $u' = Q_{ij}(u)$ in image j corresponds to the same point in the physical scene. Since the absolute pixel-to-scene calibration is rarely preordained, this correspondence must be inferred by matching the appearance of $I_j(u')$ and $I_i(u)$. Methods of performing this estimation are known in the art variously as optical flow, motion, and stereo estimation. See U.S. Pat. No. 5,649,031.

If features in the scene are highly predictable or correlated, it is possible to register image pairs that have zero overlap or even a gap between them. H. Sun et al., "Concealment of Damaged Block Transform Coded Images Using Projections onto Convex Sets," IEEE Trans. Image Process., 4(4):470–477, April 1995 discloses extrapolation and side-match measures as pertinent techniques to solve such registration problems.

Often, the $Q_{ij}$ is restricted to a parametric family of mappings, such as projective mapping or pure translation. While a simple parametric model may only be an approximation of the true mapping, it is often faster and more reliable to estimate than a higher order model. Indeed, the kind of mapping does not even have to be the same as the mapping $P_i$ to be estimated during global consistency.

More specifically, the invention divides the local alignment problem into steps in which models of increasing complexity are estimated while establishing correspondence between the images. Initially, within the local coarse registration module 304 of FIG. 3, a large range of two-dimensional translations only is searched to establish robust rough correspondence. The image is divided into multiple blocks and each block establishes its correspondence through coarse-to-fine search with normalized correlation as a match measure. Majority consensus between the blocks is used to compute the two-dimensional translation.

Once a reasonable guess of the translation is available, more accurate alignment is performed using the local fine registration module 306 by fitting progressively complex models and minimizing the sum-of-squared-differences (SSD) error measure in a coarse-to-fine manner over a Laplacian pyramid.

At each level of the pyramid, the unknown parameters are solved for by:

$$\min_{Q_{ij}} \sum_u (I_j(Q_{ij}(u)) - I_i(u))^2 \qquad (2)$$

The initial two-dimensional translation parameters at the coarsest level, and subsequently the refined parameters from each level are used to warp $I_j$ and the next increment in the parameters is solved using a Levenberg-Marquardt iteration. Local alignment is done progressively using affine and then projective parameters to establish accurate correspondence between neighboring frames. In general, the progressive complexity technique provides good correspondences between frames even when the overlap may be as low as 10%.

In order to prevent inaccurate $Q_{ij}$ estimates from unduly contaminating the global consistency stage, a reliability measure $P_{ij}$ is computed. This measure is thresholded to discard poor estimates of alignment parameters, and is also applied as a weight factor during global consistency. Using the computed $Q_{ij}$, the resulting reference and warped images are compared by one of the following: (i) the mean (or median) absolute or squared pixel value error; (ii) normal flow magnitude; (iii) normalized correlation to compute p. Normalized correlation gives the most reliable measure of alignment.

The process steps of topology determination module 304 and pairwise local alignment modules 302 and 306 lead to local maximal overlaps between frames. If the local alignment parameters were globally consistent too, then the cost function of Equation 1 is automatically optimized. However, in general, the local alignment parameters provide good correspondences between neighboring frames but may still be far from providing consistent alignment parameters for each frame's mapping to a mosaic coordinate system. In order to optimize the error function of Equation 1, it is assumed that the topology determination and local alignment have achieved a local minimum of the second term, that is the area term. Now with the overlap between frames fixed, and based on the correspondences in the overlapping areas provided by local alignment, the first term is minimized with respect to the global alignment parameters.

Within the global consistency module 308, the jointly optimum set of reference-to-image mappings $P_i$ can be determined by minimizing a global criterion that trades off two factors: (1) inconsistencies between those mappings and the relative mappings $Q_{ij}$; and (2) deviation from a priori knowledge about $P_i$:

$$\min_{\{P_i\}} \sum_{ij} E_{ij} + \sum_i E_i$$

The condition that $P_i(x)$ and $P_j(x)$ correspond to the same scene point for all reference points x can be assured if $Q_{ij}(P_i(x)) = P_j(x)$. Equivalently, when the indicated inverses exist, $P_j^{-1}(Q_{ij}(u)) = P_i^{-1}(u)$ for all points u in the ith source image. The squared error in either of these equations (or some robustifying nonlinear function thereof), weighted and summed over some or all points, constitutes $E_{ij}$.

In practice, only a subset of points is selected. Indeed, the local registration technique might only determine $Q_{ij}$ for a sparse set of points, not the entire overlap between images i and j, for reasons of efficiency or lack of image features. Even if $Q_{ij}$ were known everywhere, it is neither efficient nor necessary to sum over all points. Some possible criteria for choosing points include:

(1) periodic or stochastic sampling of points;
(2) points with high image feature saliency, e.g. lines and corners;
(3) perimeter or corner points of the overlap area.

The error $E_{ij}$, which is summed over the subset or full set of points, can sometimes be expressed as closed form function of $P_i$ and $P_j$. Alternatively the error can be left as an explicit sum. In either case, evaluation of the error function does not require access to the source image pixels and hence is very efficient.

Alternatively, instead of just estimating an exact $Q_{ij}$ for each neighboring pair, local registration could provide a fuzzy or uncertain estimate characterized by a confidence interval, covariance, probability distribution, cost function, and the like. This recognizes that insufficiency of image features may preclude accurate estimation of $Q_{ij}$. On the other hand, inconsistency between $Q_{ij}$ and $P_i,P_j$ may then be less detrimental to the visual coherency of the mosaic. Therefore, error term $E_{ij}$ can well exploit this uncertainty information.

Going further, the local registration stage could simply supply a cost function which is the image matching error, e.g.

$$E_{ij} = \sum_u (I_i(u) - I_j(Q_{ij}(u)))^2$$

In that case, global consistency would have to access source image pixels to evaluate $E_{ij}$. Alternatively, this matching error could be fit to a functional approximation, reducing the complexity of $E_{ij}$.

Error terms need not be limited to binary image comparisons. When three or more images overlap in some region, functions measuring inconsistency among $(P_i, P_j, P_k, \ldots, Q_{ij}, Q_{jk}, \ldots)$ are conceivable. In general, the global error function could include $\Sigma_{c \in C} E_c$ where C is the set of cliques of mutual neighbors. The disclosure in commonly assigned U.S. patnet application Ser. No. 08/966,776, filed Nov. 10, 1997 can be viewed as the case of a single clique where $E_c$ is the total matching error among the images and $P_i$ belongs to a particular parameterized family. Any kind of a priori desirable characteristic for the reference-to-image mappings can be included in global consistency. For example, it is usually desirable for the images to be placed in the mosaic surrounding a designated origin of the reference coordinate system. Likewise, it may be desirable to minimize the global scale, rotation, or other distortion. Another source of knowledge may be physical measurements of camera position and orientation. All such criteria can be expressed as functions of $P_i$, constituting the error term $E_i$.

Finally, in certain applications it is desired that the mosaic be constructed so that the source images align not only with each other but also with a given reference image, map, or previously constructed mosaic. One example is registering narrow field of view images with a lower resolution but wide field of view image. Another is georegistration of aerial images with satellite imagery. Error terms $E_{i,ref}$ would then be added to global consistency. $P_i$ is often restricted to a parameterized family of mappings, in which case the domain of this optimization problem is a finite-dimensional vector (this is not essential to the invention). Nevertheless, the global error criterion E is typically a complicated function of the unknown $P_i$'s and only iterative solution is possible or practical. There are various efficient algorithms for optimization. Combinations of the following strategies may be applied.

Numerical optimization algorithms known in the art may be employed to directly minimize E, including but not limited to steepest descent, conjugate gradients, Gauss-Newton, Levenburg-Marquardt, etc. Finally, optimization methods which are sensitive to outliers may be employed for doing this estimation.

As the dimensionality of the problem may be large, simultaneously minimizing E over all unknowns in a batch fashion may be computationally expensive and/or may converge slowly. Control strategies which decompose the global error into simpler subproblems are relevant:

1. Progressive complexity, where lower order models are estimated during earlier iterations.
2. Recursive approach where images (i.e. error terms) are gradually added to the total error. This is a natural approach when the images come from a live video sequence and the $P_i$'s can be updated in real time as each frame is acquired.
3. Because the topology is known, images can be grouped into clusters of neighbors. First, the error is optimized separately within each cluster, for which a "local mosaic" coordinate frame is constructed containing local-mosaic to image mappings. Second, the global reference-to-local mosaic mappings are optimized with respect to an error criterion that contains only $E_{ij}$ terms that cross between clusters. The end result is still a set of global reference-to-image mappings $P_i$.

Analogous to known multigrid and adaptive-mesh finite element algorithms for solving partial differential equations, this two level grouping scheme can then be generalized to a hierarchy of groupings. Estimation can cycle up and down the hierarchy, using the results of optimization over larger clusters to help the convergence of the smaller clusters contained within, and vice versa.

The optimization should be initialized with some reasonable starting estimate of the $P_i$'s. A suggested technique is to choose a spanning tree T of the graph of neighbors G, and begin by optimizing $E = \Sigma_{ij \in T} E_{ij}$. Since there are no loops in subgraph T, it is possible to minimize this error by simply requiring $P_j(x) = Q_{ij}(Pi(x))$ exactly for every pair of neighbors in T. As a special case, if T is all pairs of temporally adjacent frames, then this is nothing more than composing a linear chain of frame-to-frame mappings.

EXAMPLES

This section provides five example scenarios where different parameterizations are employed. Notation: for a three-dimensional vector $X=(X_1,X_2,X_3)$, define $\hat{X}=X/|X|$, for a two-dimensional vector $u=(u_1,u_2)$, define $\tilde{u}=(u_1,u_2,1)$ and $\breve{u}=(u_1,u_2,u_1u_2,1)$. Also, a homography in $P^2$ is written as $x \approx AX$ but when the output vector is written in a Euclidean form, then $u=\tilde{A}X$.

Example 1

Planar Mosaic

In order to create a seamless mosaic of a planar surface from a video sequence acquired by a freely moving camera, the reference-to-image mappings as well as relative image-to-image mappings are well described by projective mappings.

Local coarse registration uses a pure translation mapping, for efficiency, while local fine registration uses projective mapping. Topology is recalculated once, following the local coarse registration, whose translational shift estimates $Q_{ij}$ are simply integrated to give preliminary estimates of $P_i$.

Global consistency endeavors to determine the jointly optimum reference-to-image mappings of the form $\tilde{u} \approx A_i^{-1} x$. The inverse mapping is then $x \approx A_i \tilde{u}$.

The complete error function E consists of two kinds of terms:

1. For each pair of neighboring images, $$E_{ij} = \sum_{k=1}^{4} |\tilde{A}_i \tilde{u}_k - \tilde{A}_j Q_{ij}(\tilde{u}_k)|^2$$

where the $u_k$ are corners of the overlap between the images (typically four points). This term penalizes inconsistency between reference-to-image mappings and local registration.

2. For each image, $$E_i = \sum_{k=1}^{2} |\tilde{A}_i \tilde{\alpha}_k - \tilde{A}_i \tilde{\beta}_k - (\alpha_k - \beta_k)|^2$$

where $\alpha_1$, $\alpha_2$, $\beta_1$, $\beta_2$ are the midpoints of the top, left, bottom, and right sides of the source image. This term penalizes scale, rotation, and distortion of the images when warped to the mosaic. Additionally, the term $|\tilde{A}_1(0, 0, 1)|^2$ is added to $E_1$ to fix the translation of one frame.

In the absence of these terms, the solution for $A_i$ is under-determined, since any projective transformation applied to the whole reference coordinate system would not affect E.

The global error is optimized as follows. First the $A_i$'s are initialized by composing the local registration projective mappings within a spanning tree. Second the sum of $E_i$ terms only is minimized with respect to the update $A_i \leftarrow B_0 A_i$ where $B_0$ is a common projective mapping. Third, the complete E is minimized with respect to the update $A_i \leftarrow B_i A_i$ where $B_i$ is a per-image projective mapping. For the last two steps, optimization is performed using a Gauss-Newton (Levenberg-Marquardt) method, which requires only first derivatives of E with respect to the coefficients of B.

The complete topology inference and local-to-global alignment framework is illustrated in FIGS. 5A and 5B. The first cycle starts with the default topology of temporal neighbors only. The local estimator finds coarse translations $Q_{ij}$, and global estimation simply concatenates these translations into the reference-to-frame parameters $P_i$. The second cycle detects non-consecutive spatial neighbors, performs local estimation of projective models, then optimizes the global parameters. In this instance, topology converges in 2 cycles.

Example 2

Spherical Mosaic

In order to illustrate that the framework of the present invention for constructing a seamless mosaic representation is general, this example shows the creation of seamless mosaics of any three-dimensional scene from a video sequence acquired by a camera rotating about a fixed point. The camera parameters including lens distortion are unknown. In this situation the best shape for the reference surface is a sphere, which places no limitation on the angular extent of the mosaic representation. The image-to-image mappings are still well described by projective mappings, but the sphere-to-image mappings are not. The projective mappings are converted to three-dimensional rotations and camera calibration parameters to infer the two-dimensional topology on a sphere as well as to solve for globally consistent rotations and the calibration parameters.

Local coarse registration uses a rotation/translation mapping, while local fine registration uses projective mapping. Topology is recalculated once, following the local coarse registration, whose translational shift estimates $Q_{ij}$ are simply integrated to give preliminary estimates of $P_i$.

Global consistency endeavors to determine the jointly optimum reference-to-image mappings of the form $\tilde{u} \approx F R_i^T X$ where F is a upper triangular camera calibration matrix, $R_i$ is an orthonormal rotation matrix, and X is a 3D point on the unit sphere reference surface. The method disclosed in Hartley, "Self-calibration from Multiple Views With a Rotating Camera," ECCV, pp. 471–478, 1994 is used to estimate a common F from all the $Q_{ij}$'s. Using this estimation, the inverse mapping can be written as $X \approx R_i \hat{F}^{-1} \tilde{u}$. It is assumed that the same F is valid for each frame.

The complete error function E consists solely of inconsistency terms for pairs of images $$E_{ij} = \sum_{k=1}^{4} |R_i \hat{F}^{-1} \tilde{u}_k - R_j \hat{F}^{-1} \hat{Q}_{ij}(u_k)|^2.$$

For the central image in the mosaic, $R_o$ is fixed as the identity.

The global error is optimized as follows. First, the $R_i$'s are initialized by locally minimizing each $E_{ij}$ in a spanning tree. Second, the complete E is minimized with respect to the update $R_i \leftarrow B_i R_i$ where $B_i$ is a per-image rotation matrix, using a Gauss-Newton method. Note, an alternative strategy is to update both the common F matrix and the individual R matrices during each iteration of the non-linear optimization of function E.

Figure 6A:
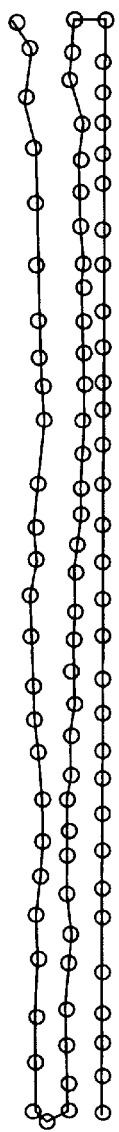
FIGS. 6A–6D depict a graphical representation of image interrelationships with reference to a spherical surface.
Figure 6B:
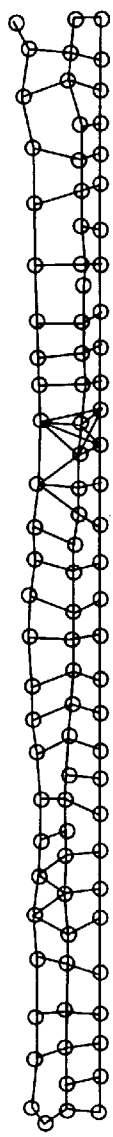
Figure 6D:
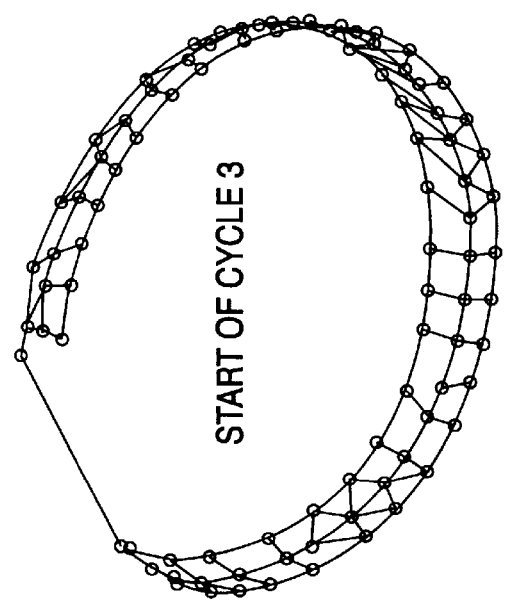
Figure 6C:
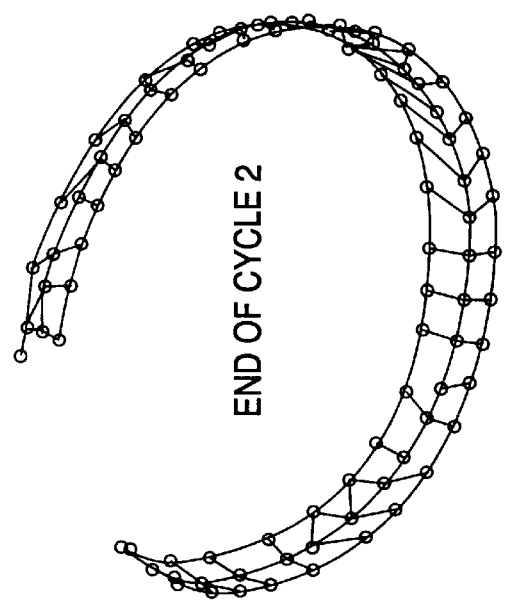

The complete topology inference and local-to-global alignment framework for a spherical mosaic surface is illustrated in FIG. 6A. The first and second cycles (FIGS. 6A and 6B) are the same as for the planar mosaic, except the spherical parameterization is used in the second cycle's global optimization. At that stage, the 360° panorama does not quite close; however, the ends are near enough so that during the third cycle (FIG. 6C) the loop closure is hypothesized, verified, and incorporated into the globally consistent estimation. In this instance, topology converges in 3 cycles (FIG. 6D).

Example 3

Strip Scanner Mosaic

The present invention may be used to create seamless mosaics of a terrestrial surveillance scene from strips acquired by an airborne panoramic camera. Such a camera looks down and swings side-to-side while the aircraft flies, ideally, in straight line at constant altitude. Each swing produces a strip—a continuous image of normal height but extended width. Due to the increasing obliquity away from the central nadir view position, the ground distance covered across the strip increases away from the center, e.g., the image is "bow tie" shaped. There is less ground coverage overlap between strips near the center, and sometimes no overlap. Nevertheless, the techniques of this invention can still align the strips, albeit with gaps in the finished mosaic.

In this situation the best shape for the reference surface is a cylinder, whose axis is the flight path. The theoretical mapping function from cylinder to source strips is somewhat unusual, and exploiting such a model requires calibration and is intolerant of deviations from an ideal flight path. Therefore, a convenient alternative is to partition each strip into a collection of smaller adjacent subimages, and treat them much like independently acquired images except for additional constraints during global consistency. The mapping function between neighboring subimages from adjacent strips shall be affine, and the reference cylinder-to-subimage mapping shall be inverse bilinear.

Topology determination is trivial due to the controlled camera motion. Local coarse registration uses a pure translation mapping, for efficiency, while local fine registration uses affine mapping. Only neighbors in different strips need to be registered since the local relationship among subimages in the same strip is known.

Global consistency endeavors to determine the jointly optimum reference-to-image mappings of the form $A_i \breve{u} = x$ where x is a two-dimensional point on the flattened cylindrical reference surface. The complete expression for E consists of two kinds of terms:

1. For each pair of neighboring images i and j, $$E_{ij} = \sum_{k=1}^{4} |A_i \breve{u}_k - A_j \breve{Q}_{ij}(u_k)|^2$$

2. Another term penalizes deviation from smoothness of the shape of the strips of subimages when warped to the reference.

The global error is minimized subject to the hard constraint that the corners of adjacent subimages ij in the same strip correspond to the same reference coordinate, i.e. $A_i \gamma_k = A_j \delta_k$, k=1,2, where $\gamma_k$, $\delta_k$ are the upper/lower left/right corners of a subimage. Since $E_{ij}$ is quadratic in the unknowns, the solution can be obtained directly.

Example 4
1D Scanning

The invention can also be used to create mosaics with one-dimensional scanning. In the prior art, creation of one-dimensional 360° panoramas is known, but the panorama is created under the constraint that the camera precisely rotates around an axis that is perpendicular to the optical axis and that the angle covered is indeed 360°. Using the present invention, such positioning and rotation constraints are relaxed and a hand held camera can be used to produce one-dimensional scans with an allowable tilt of the optical axis. The invention can also automatically detect closure of the panoramic surface, if one occurs.

The following explores the case of one-dimensional scanning when the camera is approximately rotating around some fixed axis. In the particular case of the axis being at right angles to the optical axis, the panorama is essentially created on a cylinder (similar to the prior art). In the general case when the optical axis may be tilted, the manifold is a cone with the same apex angle as that of the tilt. When the prior art techniques are applied to one-dimensional scans in which the camera is rotated around a tilted axis, the mosaic is effectively created on a cone and when the cone is developed onto a plane, the whole mosaic is curved (what is deemed a "smiley" face effect).

Figure 7:
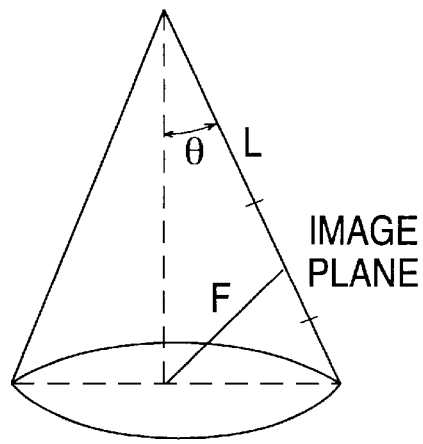
FIG. 7 depicts the geometry of an image projection onto a cone for a one-dimensional scanning implementation of the invention.
Figure 8:
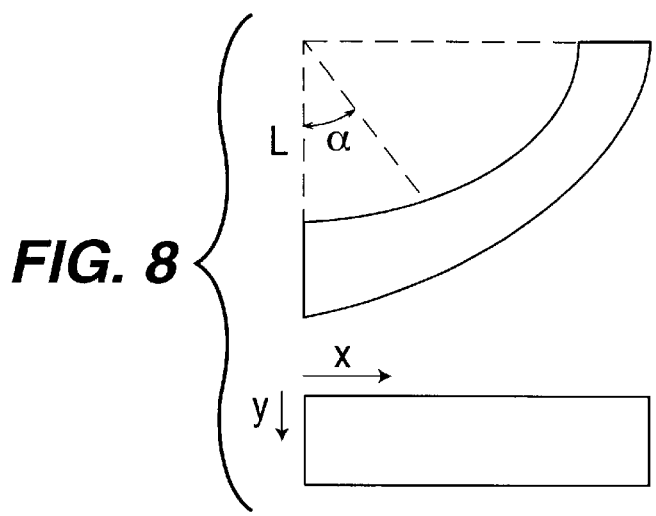
FIG. 8 depicts a graphical representation of a mosaic image mapped from a cone to a cylindrical surface.

The creation and rectification of the curved mosaic can be accomplished in a number of different ways. FIG. 7 shows the geometry of projection of the image place on the cone. Essentially if the vertical strip around the center of each image is aligned using two-dimensional rotation and translation parameters between consecutive images, it is equivalent to mapping the central strips onto a cone before performing alignment. In the special case of the cylinder, only one-dimensional translation needs to be solved for. Also, the two-dimensional rotation takes care of any inplane rotations that may occur due to the fact that the camera is hand held. When the mosaic on the cone is developed onto the place, its geometry is as shown in FIG. 8. By knowing the focal length approximately, the cone angle Θ is given by tan θ=f/L where L can be determined from the flattened mosaic. Using Θ the images can be warped corresponding to a rotation around the x axis by Θ and then a cylindrical mapping may be used.

Alternatively, a direct warp from the original video images to a rectified cylindrical mosaic can be created. Any point (l,y) in the planar mapping of the cylindrical mosaic (FIG. 7) is mapped as:

$$\begin{bmatrix} l \\ y \end{bmatrix} \rightarrow y \begin{bmatrix} \sin\alpha \\ \cos\alpha \end{bmatrix} + \begin{bmatrix} L\sin\alpha \\ L(\cos\alpha - 1) \end{bmatrix} \quad (3)$$

where α=l/L and l, L, y are as shown in FIG. 7.

In addition, automatic detection of the 360° closure can be combined with the cone to cylindrical mosaic rectification to create a seamless one-dimensional cylindrical mosaic that can be viewed using any of the standard panoramic viewers.

An outline of the one-dimensional mosaic generation process after the initial translational alignment is as follows:

1. Compute two-dimensional rotation and translation between successive frames.
2. Detect self-closure between the first frame and another frame in the sequence by alignment and evaluation of a quality metric.
3. Compute L of FIG. 7 by intersecting central lines of each frame.
4. Fill each pixel $[1 \ y]^T$ in the rectified planar mosaic by mapping it to the appropriate video frame using Eq. 3.

Example 3
Three-dimensional Representaitons

The invention as described above creates mosaics of scenes from two-dimensional imagery. Computation of the three-dimensional structure and its representation has not been explicitly dealt with in the foregoing discussion. The following describes an illustrative process for extending the invention to include generation of three-dimensional mosaics representing a three-dimensional scene. Prior techniques for processing and utilizing three-dimensional representations of scenes are disclosed in U.S. patent application Ser. No. 08/499,934 filed Jul. 10, 1995, which discloses view-based three-dimensional representations from a local collection of viewpoints. The present invention can be used to extend these techniques to create three-dimensional spherical mosaic representations of extended scenes.

In order to represent the three-dimensional information of a scene from a given viewpoint, a two-dimensional spherical mosaic is created from the given viewpoint and then from a few more viewpoints (typically one more but may be more) by changing the location of the camera. This recess creates extended views of the scene, one each from the chosen amera positions. One main advantage of creating a spherical mosaic representation from every viewpoint is that each such viewpoint provides a much wider field of view than just a single image from that viewpoint. Computing the relative orientation of the cameras and the scene depth with respect to a single frame may in general be prone to ambiguities due to the limited field of view. The specific techniques described in K. J. Hanna et al, "Combining Stereo and Motion Analysis for Direct Estimation of Scene Structure", Intl. Conf. Computer Vision, Berlin, May 1993, pp. 353–365 can be used to compute scene depth (or parallax) with spherical images thus providing a complete three-dimensional representation from one spherical viewpoint.

Figure 9:
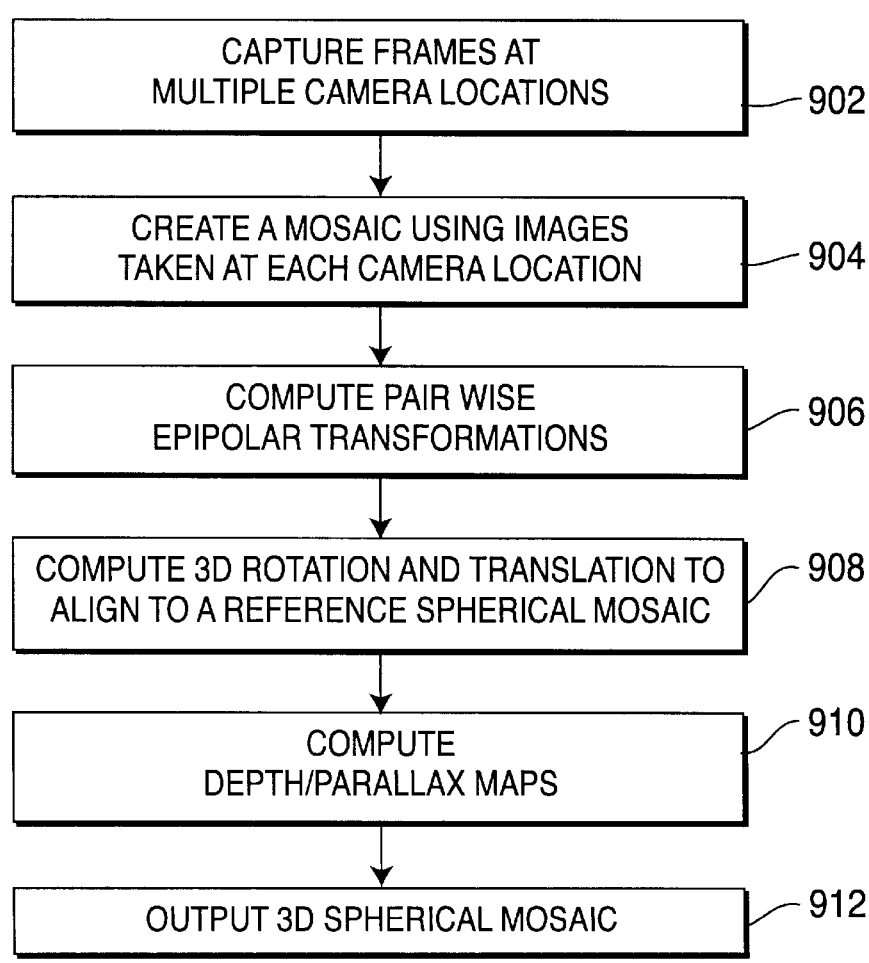
FIG. 9 depicts a flow diagram representing a process for creating a three-dimensional representation using spherical mosaics.

FIG. 9 depicts a flow diagram 900 representing the sequence of steps involved in creating the three-dimensional representation of a scene using spherical mosaics. The steps are as follows:

1. In step 902, the process captures a sequence of frames covering all possible directions viewed from a fixed camera location. The camera is then moved to capture another sequence of frames and so on until a collection of sequences are captured using a number of camera locations that cover the same scene. The different camera locations are near one another and provide the parallax information of the three-dimensional scene due to changing location so that three-dimensional information may be computed from the imagery.

2. For each camera location, create (in step 904) a mosaic representation on a sphere around that location using the methods described above that combine local correspondence information with global alignment. This process essentially creates the widest field of view possible of the scene from any single location. Therefore, the problem of computing camera viewpoint transformations between many of these single-location representations should be very stable and well-behaved.

3. Using the approximate topology in 3-space of the locations of the multiple spherical representations, at step 906, the routine first computes pairwise epipolar transformations between neighboring spherical mosaic representations by correlating identifiable points across the representations. These transformations that align spherical pairs are referred to as 2-sphere transformations.

4. With the 2-sphere transformations as the starting point, and given the 3-space topology of all the spherical representations, the routine at step 908, extends the local-to-global alignment methods described above for two-dimensional mosaicing to compute the three-dimensional rotation and translation transformations for all the 2-spheres simultaneously with respect to a reference spherical mosaic, i.e., the two-dimensional iterative process described above is extended to process three-dimensional imagery.

5. With the global three-dimensional view transformations computed, next, at step 910, the routine computes dense depth/parallax maps with respect to the reference 2-sphere using the methods described in K. J. Hanna et al, "Combining Stereo and Motion Analysis for Direct Estimation of Scene Structure", Intl. Conf. Computer Vision, Berlin, May 1993, pp. 353–365.

6. Using the parameters and maps produced in the foregoing steps, the routine at step 912 generates a three dimensional spherical mosaic.

The above method can be used within the system of FIGS. 2 and 3 to construct a "stereo spherical mosaic" given the imagery to construct two or more spherical mosaics as input (i.e., rather than use two dimensional processing in the iterative process, three dimensional processing is used).

Mosaic Creation—Generalized Form

Many different representations of a single coordinate system for representing multiple views of a scene from a fixed (pan/tilt/zoom) camera have been discussed above. These range from two-dimensional piecewise planar coordinate systems, to a cylindrical/conical coordinate system for a single axis rotation to a spherical representation for a fixed focus imaging scenario.

When the camera is moved through an environment, in general it changes orientation (rotates) and changes location (translates). In this situation, a mosaic of the scene cannot be created by a coordinate system located at/around one center of projection. The present invention can be used to solve this problem for some specific situations.

The key idea that is exploited here for creating mosaics with arbitrary motions of the camera is that no explicit depth reconstruction is required. The mosaics are created by assembling together closely spaced registered strips of images.

In order to describe the basic ideas of this implementation of the invention, the invention shall first be described in the context of the simplest case for three-dimensional mosaics: a camera moving in a straight line and looking at right angles to the direction of motion. The image planes are all coplanar for this case. Assuming continuous images and continuous motion, the central vertical line of each image is seen only in that image and hence by stacking together these central lines, a three-dimensional mosaic of arbitrary extent may be created.

Another way to create such a mosaic is to stack each of the images in an xyt cube where xy is the spatial image coordinate system and t is the time dimension. In the continuous case (or the dense sampling case), a slice through this cube along the $y=y_c$ (where $y_c$ is the y co-ordinate of the center of the image) plane creates the required mosaic.

In the more realistic situation of finite sampling of the frames in time, it has been shown in the art that any arbitrary view of the scene between any two views may be created by linear interpolation of the flow vectors between two consecutive images. This implies that even when the captured frames are coarsely sampled in time, an arbitrarily dense time sampling may be created by view interpolation. Once such a sampling is available, the creation of the mosaic is trivial as discussed above. Note that the densely sampled complete image frames need not be created but only the central slit of each frame.

If instead of a single planar view at each camera location, a cylindrical mosaic is captured by rotating the camera optical axis around the direction of motion, then the central circular rings (not just a straight line) from the panoramic mosaic created at each point may be assembled into a single 360° cylindrical mosaic whose axis is the direction of motion of the camera.

The next generalization of the parallel motion case discussed above is that of again a straight line motion of the camera but in which the optical axis is not at right angles to the motion direction. In this case, all the image planes are parallel but not coplanar. Initially, this more general case is reduced to the case of coplanar image planes by synthetically rectifying each image plane through purely a parametric transformation so that the resulting synthesized images are all coplanar. Well-known techniques exist for the rectification. Once the rectified images are obtained, by interpolating flow between consecutive frames, any arbitrary line in the image may be traced to create a mosaic.

A particularly interesting case is that of a forward looking and forward moving camera. In this case the direction of motion and that of the optical axes are the same. In this case too, in principle it is possible to create rectified sideways looking views of the scene although these views may be highly warped.

When the camera moves along an arbitrary path, the locus of all the camera projection centers is a one-dimensional curve in 3-space which in general as not a line. In this case again, rectified views are created by a piecewise linear approximation of the path that the camera takes. By combining the representations discussed above, in this situation a generalized cylinder can be used to create the mosaic. The one-dimensional camera path is the axis of the generalized cylinder and suitable ring sections of the rectified imagery are stitched together to compute this generalized cylinder representation.

Although various embodiments which incorporate the teachings of the present invention have been shown and described in detail herein, those skilled in the art can readily devise many other varied embodiments that still incorporate these teachings.

What is claimed is:

1. A method of registering a plurality of images comprising the steps of:
    (a) determining a topology of the plurality of images that identifies the images in the plurality of images that are neighbors as neighboring images;
    (b) locally registering the neighboring images to one another to produce parameters that define the relationship of the neighboring images to one another; and
    (c) performing a global consistency computation to optimize the parameters with respect to a reference surface.

2. The method of claim 1 wherein steps (a) and (b) are repeated to produce said parameters.

3. The method of claim 1 wherein step (b) further comprises:
    (b') coarsely registering said neighboring images to produce coarse parameters; and
    (b") finely registering said neighboring images to produce fine registration parameters.

4. The method of claim 3 wherein, depending on an accuracy of the image registration that is desired, steps (b'), (b") or both steps are performed.

5. The method of claim 1 further comprising the steps of:
    rendering a mosaic of the plurality of images using the optimized parameters.

6. The method of claim 1 wherein the reference surface is an arbitrary surface.

7. The method of claim 1 wherein said arbitrary surface is a planar surface, a cylindrical surface, a spherical surface, or a conical surface.

8. Apparatus of registering a plurality of images comprising:
    a topology determination module for determining a topology of the plurality of images that identifies the images in the plurality of images that are neighbors as neighboring images;
    a registration module for locally registering the neighboring images to one another to produce parameters that define the relationship of the neighboring images to one another; and
    a global consistency module for performing a global consistency computation to optimize the parameters with respect to a reference surface.

9. The apparatus of claim 8 wherein the topology determination module and the registration module are repeatedly utilized to produce said parameters.

10. The apparatus of claim 8 wherein the registration module further comprises:
    a coarse registration module for coarsely registering said neighboring images to produce coarse parameters; and
    a fine registration module for finely registering said neighboring images to produce fine registration parameters.

11. The apparatus of claim 10 wherein, depending on an accuracy of the image registration that is desired, the coarse registration module, the fine registration module or both modules are used to register neighboring images.

12. The apparatus of claim 8 further comprising:
    a color matching/blending module for rendering a mosaic of the plurality of images using the optimized parameters.

13. The apparatus of claim 8 wherein the reference surface is an arbitrary surface.

14. The apparatus of claim 8 wherein said arbitrary surface is a planar surface, a cylindrical surface, a spherical surface, or a conical surface.

15. A digital storage medium containing an executable program that, when executed upon a computer, causes the computer to perform a method of registering a plurality of images comprising the steps of:
    (a) determining a topology of the plurality of images that identifies the images in the plurality of images that are neighbors as neighboring images;
    (b) locally registering the neighboring images to one another to produce parameters that define the relationship of the neighboring images to one another; and
    (c) performing a global consistency computation to optimize the parameters with respect to a reference surface.

16. The medium of claim 15 wherein steps (a) and (b) of said method are repeated to produce said parameters.

17. The medium of claim 15 wherein step (b) of said method further comprises:
    (b') coarsely registering said neighboring images to produce coarse parameters; and
    (b") finely registering said neighboring images to produce fine registration parameters.

18. The medium of claim 17 wherein, depending on an accuracy of the image registration that is desired, steps (b'), (b") or both steps are performed by the method.

19. The medium of claim 15 wherein the method further performs the steps of:
    rendering a mosaic of the plurality of images using the optimized parameters.

20. The medium of claim 15 wherein the reference surface is an arbitrary surface.

* * * * *